US012736661B1

(12) United States Patent
Srivastav

(10) Patent No.: US 12,736,661 B1
(45) Date of Patent: Sep. 15, 2026

(54) LABELLING OBJECT DATA WITH RADAR SIGNATURES

(71) Applicant: Zoox, Inc., Foster City, CA (US)

(72) Inventor: Arvind Srivastav, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 594 days.

(21) Appl. No.: 18/103,996

(22) Filed: Jan. 31, 2023

(51) Int. Cl.
*G01S 13/86* (2006.01)
*G01S 7/41* (2006.01)
*G01S 13/58* (2006.01)
*G01S 13/931* (2020.01)

(52) U.S. Cl.
CPC ............ *G01S 13/865* (2013.01); *G01S 7/415* (2013.01); *G01S 13/582* (2013.01); *G01S 13/931* (2013.01)

(58) Field of Classification Search
CPC ...... G01S 13/865; G01S 7/415; G01S 13/582; G01S 13/931
See application file for complete search history.

(56) References Cited

U.S. PATENT DOCUMENTS

| | | | | |
|---|---|---|---|---|
| 2019/0391250 A1* | 12/2019 | Cohen | ...................... | G01S 13/87 |
| 2020/0371228 A1* | 11/2020 | Wang | .................... | G01S 13/874 |
| 2023/0046274 A1* | 2/2023 | Chen | ...................... | G01S 13/931 |
| 2023/0109909 A1* | 4/2023 | Meng | .................... | G01S 13/931 342/54 |

* cited by examiner

*Primary Examiner* — Nazra Nur Waheed
(74) *Attorney, Agent, or Firm* — Lee & Hayes, P.C.

(57) ABSTRACT

Sensors may be used to detect objects in an environment. In an example, a vehicle may include a radar sensor and one or more additional sensors. The additional sensors generate sensor data used to detect objects in the environment and determine attributes associated with the detected objects. Radar data from the radar sensor is compared to the attributes of the detected object to identify radar returns that are associated with the object. Object data is generated that associates velocity information for the identified radar returns with the object.

19 Claims, 5 Drawing Sheets

RECEIVE SENSOR DATA
502

IDENTIFY OBJECT ATTRIBUTES FROM SENSOR DATA
504

IDENTIFY RADAR POINTS BASED AT LEAST IN PART ON THE OBJECT ATTRIBUTES 506

GENERATE LABELLED DATA THAT ASSOCIATES DOPPLER VELOCITY OF POINTS WITH OBJECT 508

PASS LABELLED DATA TO A ML MODEL
510

RECEIVE, FROM THE ML MODEL, PERCEPTION DATA INFORMED AT LEAST IN PART ON THE DOPPLER VELOCITY INFORMATION 512

CONTROL A VEHICLE BASED AT LEAST IN PART ON THE PERCEPTION DATA
514

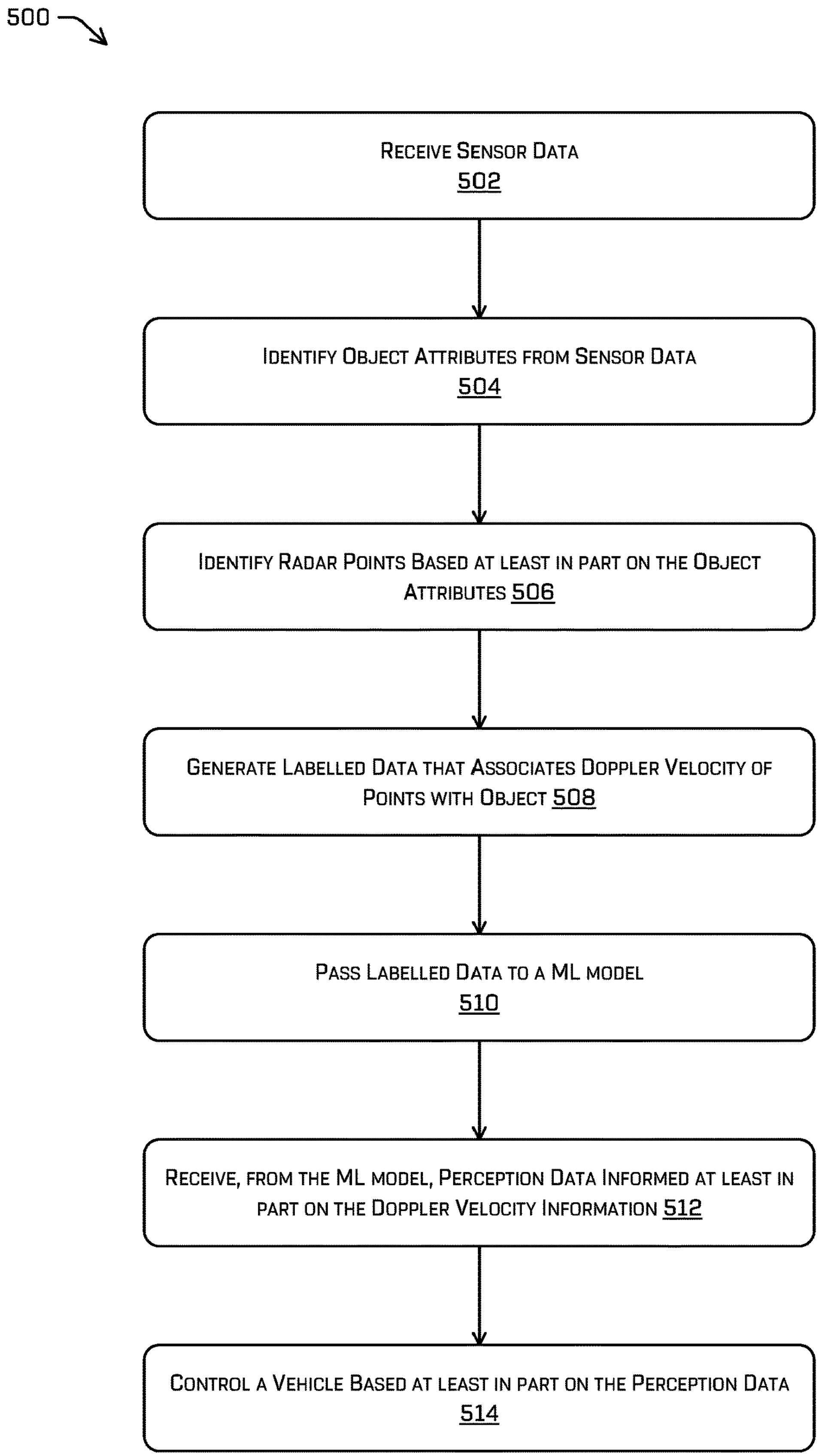

FIG. 5

LABELLING OBJECT DATA WITH RADAR SIGNATURES

BACKGROUND

Autonomous vehicles and other complex autonomous systems use various methods, apparatus, and systems to perform operations. For instance, some autonomous vehicles includes sensing systems for generating sensor data about the vehicle and/or about an environment in which the vehicle is to traverse, computing systems for identifying objects from the sensor data, computing systems for generating a path through the environment relative to the identified objects, and/or numerous other systems. In some examples, sensing systems in autonomous vehicles can include a number of different sensor modalities, with different data from the modalities being used in different manners, e.g., based on perceived strengths and/or weaknesses of the particular modality.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5 is a flowchart illustrating an example method of controlling a vehicle based at least in part on object data having associated radar data, according to aspects of this disclosure.

DETAILED DESCRIPTION

Figure 1:
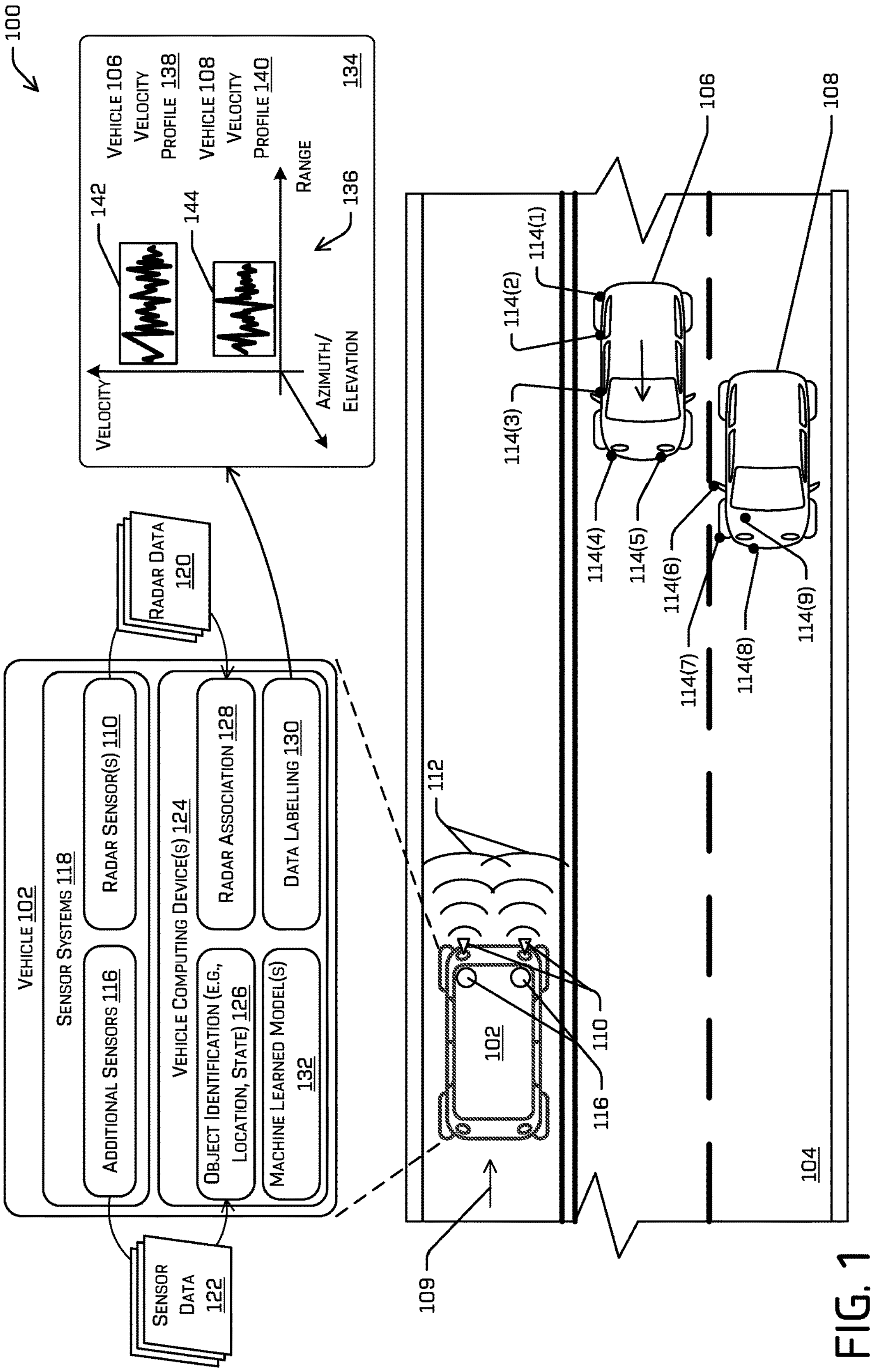
FIG. 1 is a schematic representation illustrating example systems and techniques for processing radar data in an autonomous vehicle system, according to aspects of this disclosure.

Techniques described herein are directed to characterizing movement of objects in in an environment based on radar data. For example, in implementations described herein, techniques may be used to determine radar returns that are associated with a detected object in an environment of the sensor, and use information from those returns, e.g., velocity information, to label the object data. Although many systems may benefit from the techniques described herein, an example system that implements the techniques of this disclosure may include an autonomous vehicle having one or more radar sensors and sensors of other or different modalities.

Many robotic systems, including but not limited to autonomous vehicles, include radar sensors, often in addition to other sensors. Data from the sensor(s) may be collected and used to train models, such as machine-learned models for detecting objects in an environment. In some conventional systems, objects are labeled as bounding boxes, e.g., three-dimensional bounding boxes using image data and/or LiDAR data, which have relatively higher resolution in spatial dimensions. In some implementations of these conventional systems, radar data may also be used, e.g., to determine spatial extents of objects.

In addition to generating spatial data, e.g., as depth information, azimuth information, and/or elevation information, radar sensors can also generate very high-resolution velocity data. In some examples, the radar sensor may have a resolution on the order of about 0.05 m/s. Because of this high resolution, the velocity information can comprise micro-Doppler signatures (or velocity signatures of moving objects). In some applications, the Doppler velocity dimension maybe plotted against time as a micro-Doppler signature. Because of the fine-grained resolution of micro-Doppler signatures, radar data can be used to differentiate various motions of a same object (such as a car turning a certain direction) or different objects may have different micro-Doppler signatures. Aspects of this disclosure associate the high-resolution velocity information (micro-Doppler signatures) with object representations, to provide additional and/or improved perception functionality such as for autonomous or other vehicles.

Some aspects of this disclosure include receiving sensor data from a sensor mounted on a vehicle and identifying one or more objects in the sensor data. In examples, the sensor may be a non-radar sensor such as a LiDAR sensor, a time-of-flight sensor, an imaging sensor, and/or the like. For example, an object in the sensor data may be identified by a representation, such as a bounding box. In examples, the bounding box may be a three-dimensional bounding box in a coordinate system, such as a Cartesian coordinate system. In other examples, the object representation may be a line, a curve, a point, a grouping of points, or some other representation associated with the object.

Aspects of this disclosure may also include determining one or more attributes of an identified object. For instance, the bounding box may have spatial coordinates e.g. associated with the vertices of the bounding box as attributes of the detected object. In other examples, techniques described herein can determine an estimated velocity of a detected object. In at least some examples, an object may be detected in multiple frames, e.g., a first frame and a second frame of the sensor data, and a velocity of the object may be interpolated between the first frame in the second frame. In other examples, differences between the first frame and the second frame they be used to determine an estimated yaw rate of the detected object. In examples, the estimated yaw rate may be based further on a model, such as a mathematical model, of the detected object.

Aspects of this disclosure also include associating radar data with the objects detected in the sensor data. In some examples, one or more radar sensors on a vehicle can capture radar data, e.g. as a radar scan (which may include a collection of a number of measurements of radar returns as radar data points), of the environment. The radar data may include a number of points, each having associated information. Such information may include position information, e.g., a location of the point relative to the sensor, the vehicle, and/or in a coordinate system (any or all of which may be determined based on a range and/or azimuth angle and/or elevation angle of the signal), signal strength information, e.g., a radar cross-section (RCS) value, or velocity information, e.g., a velocity of the point relative to the sensor.

In some examples of this disclosure, radar data can be associated with the detected object based on a comparison of spatial information, e.g., range information, azimuth information, and/or elevation information, with spatial information associated with a bounding box associated with a detected object. For example, a radar return may be associated with the detected object when a position of the radar return falls within the bounds of the bounding box. In additional examples of this disclosure, radar data may be associated with the detected object based at least in part on the estimated velocity of the detected object. For example, velocity information associated with the radar returns may be compared to the estimated velocity, and the radar return may be associated with the detected object when the measure velocity is within a threshold difference of the estimated velocity. In further examples of this disclosure, velocity information associated with the radar returns may be compared to an estimated velocity range determined based at least in part on the estimated yaw rate of the detected object.

Techniques described herein can also be used to label object data using the velocity data of the radar points associated with the detected object. In some examples, the velocity information of the radar points associated with the detected object can be used to generate a velocity profile, e.g., showing velocities for all points associated with the object. In some examples, the velocity profile may be a two-dimensional profile that associates the Doppler velocities of radar points with a depth of the radar points. For example, the two-dimensional profile may be a projection of the radar points into the two dimensional space including the velocity and depth dimensions. Also in examples, an annotation or representation of the velocity profile may be included with the label data. Without limitation, the velocity profile may be annotated by a bounding box, such as a two-dimensional bounding box that extends between the minimum and maximum depths of the detected object and the minimum and maximum velocities of the detected object. Other annotations/representations also are contemplated.

The label data generated according to techniques described herein may be passed to one or more machine-learned models to generate additional information about the detected object. As noted above, micro-Doppler signatures may be useful tools to understand nuanced information about objects, and a machine-learned model with access to the high resolution radar data contained in the velocity profile may similarly be used to determine additional information about the object. Without limitation, the machine-learned model may be trained to identify a movement pattern or intention of an object. For instance, a micro-Doppler signature may be useful to differentiate between an object traveling in a straight direction and an object that is turning. In other examples, the machine-learned model may be trained to detect partially-occluded objects more quickly than using other sensor modalities. For example, the velocity information may be useful to differentiate a pedestrian emerging from behind a parked vehicle. Other benefits and uses for the label data are detailed further herein.

Techniques described herein are directed to leveraging sensor and perception data to enable a vehicle, such as an autonomous vehicle, to navigate through an environment while circumventing objects in the environment. Techniques described herein can utilize information sensed about the objects in the environment, e.g., by radar sensors, to more accurately determine movement associated with the object. For example, techniques described herein may be faster than conventional techniques, as they may alleviate the need for information from a plurality of different sensors. That is, techniques described herein provide a technological improvement over existing object detection, classification, prediction and/or navigation technology. In addition to improving the accuracy with which sensor data can be used to determine objects and correctly characterize motion of those objects, techniques described herein can provide a smoother ride and improve safety outcomes by, for example, more accurately providing safe passage to an intended destination.

While this disclosure uses an autonomous vehicle in examples, techniques described herein are not limited application in autonomous vehicles. For example, any system that uses radar data to navigate an environment may benefit from the radar data processing techniques described. By way of non-limiting example, techniques described herein may be used on aircrafts, e.g., to identify other aircraft and/or moving objects. Moreover, non-autonomous vehicles could also benefit from techniques described herein, e.g., for collision detection and/or avoidance systems.

FIGS. 1-5 provide additional details associated with techniques described herein. More specifically, FIG. 1 is a schematic illustration showing an example scenario 100 in which a vehicle 102 is driving on a road surface 104. As illustrated, a second vehicle 106 and a third vehicle 108 also are travelling on the road surface 104. In the example scenario 100, the vehicle 102 is moving generally in the direction of arrow 109, and the second vehicle 106 and the third vehicle 108 are travelling generally in an opposite direction. For instance, the vehicle 102 may be driving in an east-bound lane and the second vehicle 106 and the third vehicle 108 may be driving in side-by-side, west-bound lanes. Also in the example, the second vehicle 106 may be overtaking or passing the third vehicle 108.

For illustration, the vehicle 102 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 102 can be configured to control all functions from start to stop, including all parking functions, it can be unoccupied. Additional details associated with the vehicle 102 are described below. However, the vehicle 102 is merely an example, and the systems and methods described herein can be incorporated into any ground-borne, airborne, or waterborne vehicle, including those ranging from vehicles that need to be manually controlled by a driver at all times, to those that are partially or fully autonomously controlled. In additional implementations, techniques described herein may be useful in settings other than vehicles. The techniques described in this specification may be useful in many different applications in which sensor data is used to determine information about objects in an environment.

The vehicle 102 may include a plurality of sensors, including one or more radar sensors 110. In the example, the radar sensor(s) 110 are arranged to propagate waves generally in a direction of travel of the vehicle 102 (e.g., generally along the direction of the arrow 109). In other examples, more (or fewer) radar sensor(s) 110 may be provided, including sensors configured to propagate waves in one or more additional or alternative directions. In examples, instances of the radar sensor(s) 110 may have overlapping fields of view, although such may not be required. As will be appreciated, emitted radio waves 112, emitted by the radar sensor(s) 110, will reflect off the second vehicle 106 and the third vehicle 108 and return to the radar sensor(s) 110, where they are detected via a radar scan. In some examples, the radar sensor(s) 110 may be substantially identical, except for their position on the vehicle 102. In other examples, however, the radar sensor(s) 110 may be differently configured. By way of non-limiting example, the radio waves 112 may be emitted at different frequencies, e.g. pulse-regulated frequencies. Also in examples, the radar sensor(s) 110 may be configured such that scans at the sensor(s) 110 have a different interval, e.g., a Doppler interval. In examples, features of the radar sensor(s) 110, including but not limited to the center frequency, the scan type, the scan pattern, frequency modulation, the pulse repetition frequency, pulse repetition interval, may be configured, e.g., to create the different Doppler intervals. In other examples, however, several features and functions of the radar sensor(s) 110 may be the same or similar.

The sensor(s) 110 may receive the emitted radio waves 112 after the waves reflect off a surface in the environment, e.g., a surface of the second vehicle 106, the third vehicle 108, and/or other surfaces, and the radar sensor(s) 110 can generate radar data based on the reflection. For instance, the radar data may include diverse types of information, including but not limited to a velocity associated with each of many points representative of surfaces or objects in the environment of the sensor(s) 110. By way of non-limiting example, when the sensor(s) 110 are pulse-Doppler sensors, the sensor(s) 110 may be able to determine a Doppler velocity, e.g., a velocity of an object relative to the respective sensor.

In more detail, FIG. 1 illustrates a plurality of radar returns, schematically represented by points. In the illustration, points 114(1), 114(2), 114(3), 114(4), 114(5) are illustrated as circles, and represent radar returns associated with the second vehicle 106. That is, individual of the points 114(1)-114(5) are indicative of locations on the second vehicle 106 at which the first emitted waves 112 reflect. Similarly, points 114(6), 114(7), 114(8), 114(9) also are illustrated as circles, and represent radar returns associated with the third vehicle 108. Stated differently, individual of the points 114(6)-114(9) are indicative of locations on the third vehicle 108 at which the emitted waves 112 reflect.

As noted above, the points 114 may have an associated velocity, e.g., a Doppler velocity. As in conventional radar sensors, the points 114 may also have a range, e.g., a depth or distance from the sensor, and an azimuth, e.g., an angle relative to some reference line. In other examples, the radar sensor(s) 110 may be four-dimensional radar sensor(s), capable of also determining an elevation, e.g., an angle or distance above a horizontal reference plane (e.g., a ground plane, which may be parallel to the two-dimensional plane of FIG. 1). Thus, the radar sensor(s) 110 may be capable of generating, per point, depth information, azimuth information, elevation information, and/or velocity information. As detailed further herein, the radar data may be used to generate labels, annotations, or the like, of objects in the environment, like the second vehicle 106 and/or the third vehicle 108. For example, aspects of the radar data may be used to label an object identification, with subsequent processing of the labelled data being used to perceive various attributes or actions of the object, as detailed herein.

As illustrated in FIG. 1, the vehicle 102 also includes a plurality of additional sensors 116. The additional sensors 116 may be disposed to sense objects generally in the same direction as the radar sensor(s) 110. Without limitation, the additional sensors 116 may be one or more of additional radar sensors, LiDAR sensors, imaging sensors (e.g., cameras), time-of-flight sensors, sonar sensors, thermal imaging devices, or any other sensor modalities. Although two instances of the additional sensors 116 are illustrated in FIG. 1, the vehicle 102 may include any number of additional sensors, with any number of different modalities. In examples, the radar sensor(s) 110 and the additional sensors 116 may be disposed generally to detect objects in the direction of the arrow 109, e.g., to detect the second vehicle 106 and the third vehicle 108, and the vehicle 102 may include a number of additional sensors disposed to detect objects at other relative positions. Without limitation, the vehicle 102 can include instances of the radar sensors 110 and instances of the additional sensors 116 that provide for sensing objects at 360-degrees relative to the vehicle 102.

As illustrated in the block diagram accompanying FIG. 1, the radar sensor(s) 110 and the additional sensors 116 represent types of sensor systems 118 on the vehicle 102. The radar sensor(s) 110 generate radar data 120. In examples, the radar data 120 includes position data of the respective points 114. For example, information associated with radar returns corresponding to the points 114 may include information indicative of a location in the environment, e.g., a location of the points 114. The location information may include range information, azimuth information, and/or elevation information, or the location information may include information about a position in a local or global coordinate system. Also in implementations, the radar data 120 may include signal strength information. For example, the signal strength information can indicate a type of the object. More specifically, radio waves may be reflected more strongly by objects having certain shapes and/or compositions. For example, broad, flat surfaces and/or sharp edges are more highly reflective than rounded surfaces, and metal is more highly reflective than a person. In some instances, the signal strength may include a radar cross-section (RCS) measurement. As also noted above, the radar data 120 also includes velocity information. For instance, a velocity of each of the points 114 may be based on a frequency of radio energy reflected from surfaces at the points 114 and/or a time at which the reflected radio energy is detected.

Accordingly, the radar data 120 can include, per-point (e.g., of the points 114) or per-return, a distance from the radar sensor(s) 110 (e.g., a range or radial distance), one or more locations relative to the radar sensor(s) 110 (e.g., an azimuth angle and/or elevation angle), a velocity (e.g., a Doppler velocity) along the distance, a strength measurement (e.g., an RCS value), and/or additional information.

The additional sensors 116 generate sensor data 122. In specific examples described herein, the additional sensors 116 may be three-dimensional sensors, such as LiDAR sensors, time-of-flight sensors, and/or three-dimensional imagers. In examples, the sensor data 122 may include position information of objects in the environment, like positions of the second vehicle 106 and the third vehicle 108.

In examples described in detail herein, the radar data 120 and the sensor data 122 are used generally to identify and label objects, or candidate objects, in the environment. More specifically, FIG. 1 illustrates that the vehicle 102 can include one or more vehicle computing device(s) 124 for executing functionality, e.g., using one or more computing modules, components, or systems, associated with the radar data 120 and the sensor data 122. As shown, the vehicle computing device(s) 124 include an object identification component 126, a radar association component 128, a data labelling component 130, and one or more machine-learned models 132. These systems and components are described in turn.

The object identification component 126 includes functionality to receive the sensor data 122, e.g., from the additional sensors 116, and identify one or more objects from the sensor data 122. For example, the object identification component 126 can implement one or more clustering algorithms, machine-learned models, tracking algorithms, and/or other perception techniques to identify the presence of an object, like the second vehicle 106 or the third vehicle 108, in the sensor data. In examples, the object identification component 126 can comprise a portion of a perception pipeline implementing several models and techniques to identify objects in raw data, such as LiDAR and/or image data. The object identification component 126 can also include functionality to generate state data about objects (or potential objects) based on the sensor data 122. For instance, the object identification component 126 can include functionality to determine a location of an object in a local or global coordinate system. For example, the coordinate system may be a two- or three-dimensional coordinate system, including but not limited to a Cartesian coordinate system. In one specific example, the additional sensors 116 include a LiDAR sensor, and the sensor data 122 is one or more LiDAR point clouds. Using the point clouds, the object identification component 126 can determine the bounds or extents of an object, e.g., as a three-dimensional bounding box, in a three-dimensional coordinate system. The object identification component 126 may include one or more models, including but not limited to machine-learned models configured to identify LiDAR points associated with a same object, e.g., based on position, intensity, and/or other characteristics, and generate a bounding box representative of perceived objects. Applying this example to FIG. 1, the object identification component 126 can include functionality to generate a first three-dimensional bounding box representative of the second vehicle 106 and a second three-dimensional bounding box representative of the third vehicle 108. Although bounding boxes are used in some examples described herein, the object identification component 126 can include functionality to generate additional and/or different object representations. Other example object representations can include lines, curves, one or more points, and/or other representations having two-, three-, or more dimensions.

The object identification component 126 can also include functionality to determine, based at least in part on the sensor data 122, state, pose, and/or other attributes of a detected object. For instance, the object identification component 126 can include functionality to determine an estimated body velocity and/or an estimated yaw rate, of a detected object. In one example, the object identification component 126 can receive the sensor data 122 including a first frame, e.g., associated with the sensor data 122 representative of the environment at a first time, and a second frame, e.g., associated with the sensor data 122 representative of the environment at a second time. The object identification component 126 can also receive additional frames of the sensor data 122, e.g., at different times. The object identification component 126 can include functionality to determine relative movement of objects between frames, e.g., between the first frame and the second frame, to determine an estimate of dynamic characteristics, e.g., velocity, yaw rate, or the like of a detected object. Continuing the example from above, the object identification component 126 can include functionality to generate a first bounding box from the first frame of the sensor data 122 (e.g., a bounding box of the second vehicle 106 and/or of the third vehicle 108) and a second bounding box from the second frame of the sensor data 122 (e.g., a second bounding box of the second vehicle 106 and/or of the third vehicle 108). The object identification component 126 can also include functionality to interpolate movement between the first bounding box and the second bounding box, e.g., to estimate a crude velocity of the associated object, e.g., a body velocity of the associated object.

In still further examples, the object identification component 126 can estimate a yaw rate for the object. Similar to the example just given, the object identification component 126 can determine a relative rotation between a first bounding box, or other object representation, associated with a first frame of the sensor data 122 and a second bounding box, or other object representation, associated with a second frame of the sensor data 122. For instance, the object identification component 126 can interpolate a crude yaw rate, e.g., along with the crude velocity described above. As detailed further herein, the location (position) information of the object(s), the estimated velocity, the estimated yaw rate, and/or other data determined by the object identification component 126 using the sensor data 122 may be used to associate radar data with the object(s).

The radar association component 128 includes functionality to identify radar data 120 generated by the radar sensor(s) 110 that is associated with an object, such as an object identified by the object identification component 126. More specifically, the radar association component 128 includes functionality to compare the radar data 120 to attributes of identified objects to determine which radar returns are associated with the object.

In some instances, the radar association component 128 can identify points in the radar data 120, e.g., the points 114, that are associated with a detected object, by comparing positional information of the radar data 120, e.g., depth information, azimuth information, and/or elevation information, to coordinates associated with a location of the object, as determined by the object identification component 126 using the sensor data 122. In one scenario, the object identification component 126 may identify the coordinates of a bounding box descriptive of an object in a cartesian coordinate system (e.g., a three-dimensional cartesian coordinate system). In this example, the bounding box has an extent in the x-direction, at some distance in the x-direction from the sensor, an extent in the y-direction, at some distance in the y-direction from the sensor, and an extent in the z-direction, at some distance in the z-direction from the sensor. As described above, each point in the radar data can include a range dimension (e.g., a straight-line depth or distance), an azimuth dimension (e.g., an angle in a horizontal plane), and an elevation dimension (e.g., an angle in a vertical plane). Using simple geometry, the radar association component 128 can convert the range/azimuth/elevation information for each radar point to a corresponding position in the cartesian coordinate system of this example. In this manner, the radar association component 128 can determine which of the points in the radar data 120 falls within the bounding box(es) determined by the object identification component 126. The radar association component 128 can quickly and reliably determine, using geometric dimensions, radar data that is associated with an object identified using the sensor data 122 from additional sensors 116.

The radar association component 128 can use additional or alternative techniques to associate points in the radar data 120 with the object identifications determined by the object identification component 126. For example, as discussed above, the object identification component 126 can determine information corresponding to an estimated velocity of a detected object, e.g., using multiple frames of the sensor data 122 and interpolating the frames. As also detailed herein, the radar data 120 also includes velocity data. In some examples, the radar association component 128 can identify points having a velocity that is close to, e.g., within a threshold of, the estimated velocity. In examples, using both the estimated velocity and the geometric or positional information may provide a more robust identification of points in the radar data 120 that correspond to an object. For example, in instances in which the object identification component generates a bounding box to represent a detected object, there may be sections of the bounding box that are not actually associated with the object. While a radar return of the radar data 120 may be associated, spatially, with the bounding box, the return may actually have been generated via a return from a nearby surface. The radar association component 128 may use the velocity information to further identify points that should (or should not) be associated with the object, based on the similarity of the velocity information to an estimated or expected velocity.

The radar association component 128 can similarly use yaw rate to determine portions of the radar data 120 that are associated with the object identified by the object identification component 126. For example, using an estimated yaw rate of the detected object and, in some instances, a motion model for the object type, e.g., vehicle, pedestrian, bicyclist, and/or the like, the radar association component 128 can identify an estimated range or spread of velocities (e.g., relative velocities) that would be associated with the detected object. In the example of FIG. 1, should one of the vehicles 106, 108 being turning, changing lanes, or the like, the velocity information associated with the front of the vehicle may be very different from the velocity information associated with the rear of the vehicle. The estimated yaw rate may provide a more robust understanding of the velocities likely to be measured on the vehicle, as opposed to a single, body velocity.

In examples described herein, the object identification component 126 and the radar association component 128 can operate at a similar frequency. For example, for each instance of an object identified by the object identification component 126, points from a radar return most closely associated in time with the object identification can be associated with the object. Alternatively, the object identification component 126 and the radar association component 128 may operate at different frequencies. For example, the object identification component 126 can operate at a first, e.g., primary, frequency, and the radar association component 128 can operate at a second, e.g., higher, frequency. For instance, the radar data may be generated and/or accessible to the radar association component 128 at a higher frequency than objects are identified by the object identification component 126. In these examples, the radar association component 128 operating at the high frequency can provide a more robust sampling of Doppler velocity and/or range measurements over time. For example, and by way of non-limiting example, if the object identification component 128 determines a new or updated object representation every 0.5 seconds, the radar sensor(s) 110 may generate radar data every 0.1 seconds. The radar association component 128 can associate radar at the higher frequency, which can result in finer detail from the radar data, including velocity signatures at a higher frequency, which may be more accurate.

In some examples, by determining the radar data 120 at a higher frequency, the radar association component 128 can associate radar data with a track associated with a previously-identified object. That is, the object identification component 126, or some other component, may determine, predict, or otherwise identify an object track, and the radar association component 128 can associate the radar data, including the velocity signatures, the range data, and/or other information generated by the radar sensor(s) 110, with the object track. For example, and without limitation, the radar data may be associated with a tick for a snapshot of a scene but, within that snapshot, a finer-grained velocity signature may be determined from the radar.

The data labelling component 130 includes functionality to associate velocity information with the object identification. For example, once the radar association component 128 has determined the radar points that are associated with an object of interest, the data labelling component 130 can generate a label, tag, or other annotation that includes the velocity information, e.g., Doppler velocity information, of the associated points. In some examples, the data labelling component 130 can determine a velocity profile for each object, and associate information about the velocity profile as a label or annotation.

An example 134 shows aspects of data labelling. The example 134 includes a representation 136 plotting velocity relative to range for the radar points that are indicated as being associated with objects (e.g., the second vehicle 106 and the third vehicle 108). The representation 136 may be a projection of the radar points from the radar data 120 identified by the radar association component 128 as being associated with the vehicle 106 and the vehicle 108 into a two-dimensional range, velocity plane. In other examples, the representation may be a three- or four-dimensional representation of the radar data. A first velocity profile 138 corresponds to the second vehicle 106 and a second velocity profile 140 corresponds to the third vehicle 108.

The velocity profiles 138, 140 illustrate the Doppler velocities of (each of) the points identified by the radar association component 128. As will be appreciated from the representation 136, the depth of the two objects is very similar, e.g., they have an overlapping range. However, the velocities associated with the two objects are different. In the examples, the second vehicle 106 may be passing or overtaking the third vehicle 108, the third vehicle may be slowing down to turn or stop, or the like. As will also be appreciated from the representation 136, the radar points associated with each of the vehicles 106, 108 do not return a constant (same) velocity. Thus, for example, instead of each of the vehicles being represented as having a single velocity, the radar returns show that different portions of the vehicles have varying velocities, e.g., a velocity profile.

In examples, the data labelling component 130 can associate the velocity profiles 138, 140 with the objects identified by the object identification component 126. In some conventional perception systems, velocity information from radar data may not have been associated with object identifications. Alternatively, some conventional systems may associate a single object velocity (e.g., a mean velocity, estimated velocity, and/or the like) and/or a body yaw with an identified object. However, in techniques described herein, methods and systems associate a velocity profile with an object identification. In many radar sensors, Doppler velocity is more precise than any of the positional information (e.g., depth, azimuth, elevation). Accordingly, associating these measured Doppler velocities, e.g., as a velocity profile may lead to improved sensing in some instances. In some examples, the data labelling component 130 can also annotate the velocity profile(s) 138, 140. In the illustrated example, a first annotation 142 generally comprises a two-dimensional bounding box bounding the minimum and maximum velocities and the minimum and maximum ranges of the first velocity profile 138. Similarly, a second annotation 144 comprises a two-dimensional bounding box bounding the minimum and maximum velocities and the minimum and maximum ranges of the second velocity profile 140. In examples, the annotation 142, 144 can be associated with the objects, e.g., in addition to or instead of the velocity profiles 138, 140.

The machine-learned model(s) 132 may include functionality to receive the labelled data generated by the data labelling component 130 and generating one or more outputs. For example, because the labelled data includes the velocity information, a machine learning model can be trained to identify attributes of objects using the velocity information. In some instances, the machine-learned model(s) 132 may be trained to output some information about an object, e.g., a classification or an object or a confirmation of a previously-estimated classification using a single instance of the velocity information, e.g., as represented by the velocity profiles 138, 140. For instance, different types of objects may have different velocity profiles that are readily apparent from the high-resolution velocity profiles according to this disclosure.

In other examples, the machine-learned model(s) 132 may combine a series of velocity profiles. For instance, a plurality of velocity profiles may be determined using serially-acquired radar data, and these profiles can be used to generate a representation or signature of the object over time. Such a signature may be a micro-Doppler signature. As noted above, because velocity information may have a higher resolution than other types of radar information, the micro-Doppler signature can provide clues, e.g., as fine-grained nuances in velocity differences and distributions, that can be used to identify or perceive different types of objects. For instance, a pedestrian may have a first micro-Doppler signature, a bicycle/rider may have a second micro-Doppler signature, and a vehicle may have a third micro-Doppler signature. Moreover, because the micro-Doppler signature is a time-wise representation of velocity at different points on the object, the micro-Doppler signature may also be useful to differentiate between types of movement of the object. For example, the micro-Doppler signature for a vehicle that is approaching head-on versus the micro-Doppler signature for a vehicle that is turning will be different, e.g., at least in part because of the direction of relative movement of the vehicle, positions and/or aspects of the wheels of the vehicle, and/or the like. The machine-learned model(s) 132 may be trained to classify objects and/or classify object motion based at least in part on a single velocity profile, e.g., for a single moment in time, and/or based at least in part on the micro-Doppler signatures. In some examples, a micro-Doppler signature can be generated by the data labelling component 130 and associated with data prior to input to the machine-learned model(s) 132. In other examples, however, the machine learning model(s) 132 may be trained only on (and/or only receive) the input velocity profiles and/or annotations, with the model gleaning the micro-Doppler signatures, or similar data, from the input data.

In some examples, the machine-learned model(s) 132, with the benefit of the object data labelled with velocity information, may be configured to output a turn intention of an object. With the micro-Doppler signature, radar data can be used to pick turning intention objects more quickly. Some conventional perception systems use data associated with a turn indicator, e.g., by sensing a blinker or directional turn light. Relying on these visual clues, however, be error prone, for instance, because some drivers may not signal prior to turning, some non-radar sensors can be adversely affected by different ambient light conditions and/or certain weather conditions. Radar sensors are generally reliable in varied light and/or weather conditions.

The machine-learned model(s) 132 may also, or alternatively, be used to identify moving objects that are of particular interest, e.g., critical objects that may adversely affect travel of the vehicle 102, such as objects that may unexpectedly impact travel. In some scenarios, a moving critical object is occluded, e.g., by a parked car or truck. Image- or light-based sensors may only identify upon becoming visible to a relatively large extent. However, while the occluding object (e.g., the parked car or truck) may have little or no velocity, the moving object will have a different, non-zero velocity. Thus, even though the object identification component 126 may identify only a single object, e.g., based on the sensor data 122 from the additional sensors 116, the radar data determined by the radar association component 128 and associated with the object identification by the data labelling component 130 can include velocity data used by the machine-learned model(s) 132 to identify a mostly- or partially-occluded object quickly and robustly. In some examples, this determination may be made from a single velocity profile, e.g., from points from a single radar return.

The machine-learned model(s) 132 may also include functionality to identify two objects in close proximity of each other, e.g., regardless of criticality. In the example of FIG. 1, the second vehicle 106 and the third 108 vehicle 108 may have characteristics that cause the object identification component 126 to identify a single object. For example, the object identification component 126 may generate a single bounding box that encompasses the extents of both the second vehicle 106 and the third vehicle 108. In this example, the radar association component 128 may identify all of the points 114(1)-114(9) as being associated with the (single) bounding box, based solely on the positional information. However, the machine-learned model(s) 132 may identify the presence of two distinct velocity profiles, e.g., the velocity profile 138 and the velocity profile 140. Based on the presence of the two velocity profiles, the machine-learned model(s) may identify two objects, despite the object identification component 126 suggesting only a single object. In some examples, this determination may be made from a single velocity profile, e.g., from points from a single radar return.

The machine-learned model(s) 132 can also, or alternatively, be trained to receive the labelled data and output identifications of objects at a distance, e.g., sooner and more reliably than other sensor modalities. While the azimuth and/or elevation measurements may be less reliable at longer distances, the Doppler velocity and range may have high resolutions, allowing for reliable, early detection of high-speed objects at long range.

The machine-learned model(s) 132 may also, or alternatively, be trained to differentiate between object types. For example, a vehicle may have a different velocity profile and/or a different micro-Doppler signature than a pedestrian, which may be different from a bicyclist. Accordingly, the high resolution velocity profiles, including as the micro-Doppler signatures, may provide significant improvement over conventional techniques for classifying objects.

The outputs of the machine-learned model(s) 132 may be used to control aspects of the vehicle 102. For example, by identifying an object or a movement of an object, the vehicle 102 can be controlled to operate relative to the object. The vehicle may be controlled to slow down or stop for a critical object. The vehicle 102 may anticipate a turning vehicle and navigate at least in part based on that turn. The vehicle 102 may also identify objects more quickly and/or with greater certainty, allowing for other modifications to planning and control systems.

In some implementations, one or more of the object identification component 126, the radar association component 128, the data labelling component 130, and/or the machine-learned model(s) 132 may be incorporated into or otherwise associated with a perception system of the vehicle 102. The perception system may be configured to generate object representations at a predetermined frequency. The perception system may implement one or more fusion models, e.g., to determine an object from multiple sensors and/or multiple sensor modalities. Some conventional fusion models may include radar data to generate an object representation, and some conventional perception models may even associate a nominal velocity with an object determination. However, as detailed herein, aspects of this disclosure provide functionality to associate velocity values for numerous points with an object representation, e.g., as a velocity profile or other aggregation of velocities. As detailed herein, the velocity information may include high resolution micro-signatures. Thus, while the object representation may be a relatively lower resolution of sensor data, e.g., a bounding box, curve, point(s), or the like, the associated velocity data has, relatively, a very high resolution.

Techniques described herein may improve perception system and/or planning system accuracy and performance by using radar data to identify objects and/or to determine attributes of detected objects. For instance, radar sensors, like the radar sensors 110 can be among the quickest sensors on some vehicles to generate meaningful amounts of data about objects, like the second vehicle 106 and/or the third vehicle 108. For example, the radar sensors 110 may generate data about objects that are relatively farther away than can be detected by imaging sensors, LiDAR sensors, or the like. Moreover, radar sensors may be more reliable in low-light situations, e.g., at night, and/or during certain atmospheric conditions, e.g., during rainy weather, foggy weather, snowy weather, or the like. Conventionally, however, despite these benefits of radar sensors, radar data has not been used to label, annotate, or otherwise associate data with velocity information. Techniques described herein, however, generate an object representation from sensor data, e.g., non-sensory data, determine radar returns associated with the object representation, and associate velocity information (as well as, in some instances, additional or other information) with the object representation. As will be appreciated, training machine learning models on more robust data and/or passing the more robust data into a trained model can provide improved outcomes over models that do not include radar data. Moreover, the techniques described herein can label data quickly and accurately, e.g., by identifying those radar returns that are associated with objects of interest, e.g., as opposed to considering velocity values for all points in a radar return. That is, the object representation and the label data are generated quickly, and are relatively high resolution. Moreover, as noted above, because radar sensors may detect objects at greater distance than other sensor modalities and/or because velocity information may allow for quicker identification of certain moving objects, the techniques detailed herein may promote earlier identification and/or tracking of objects, thereby improving safety outcomes for the vehicle 102 as the vehicle 102 travels relative to the objects. Additional aspects of tracking objects using object representations from radar data will now be discussed with reference to FIGS. 2 and 3.

Figure 2:
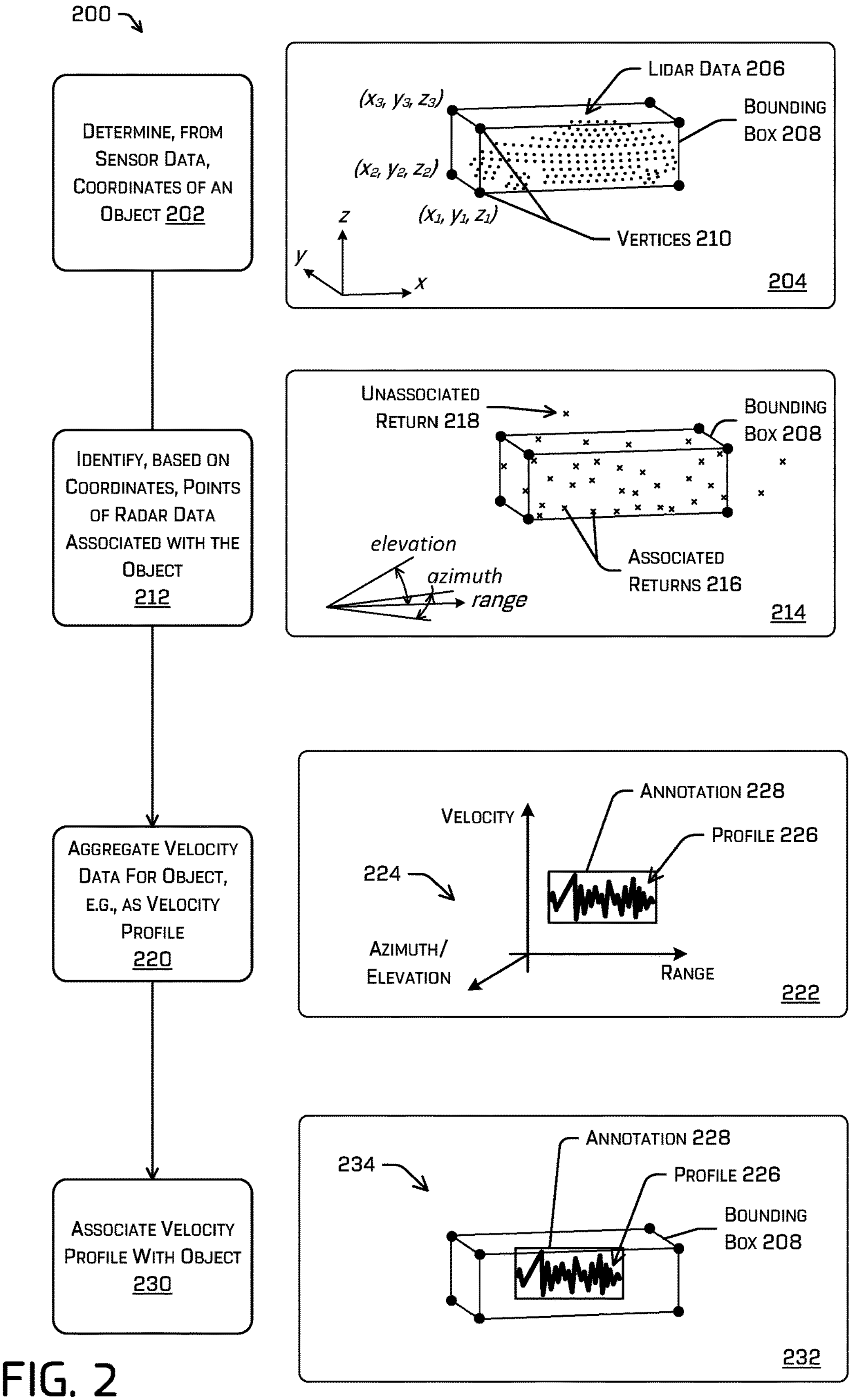
FIG. 2 includes textual and visual flowcharts to illustrate an example method for associating radar data with an object, according to aspects of this disclosure.

FIG. 2 includes textual and visual flowcharts to illustrate an example process 200 for associating velocity data with objects. In examples described herein, the velocity data may be obtained from radar data captured by radar sensors disposed on an autonomous vehicle. In this example, the process 200 uses one or more sensors, e.g., non-radar sensors such as LiDAR or imaging sensors, to determine a representation of an object in the environment of the autonomous vehicle and then uses radar data generated by a radar sensor to associate velocity information with the representation of the sensed object.

At an operation 202, the process 200 includes determining, from sensor data, coordinates of an object. An example 204 accompanying the operation 202 illustrates LiDAR data 206, e.g., a LiDAR point cloud, including a plurality of LiDAR points associated with an object. In the example, the object may be a vehicle, like one of the vehicles 106, 108 discussed above in connection with FIG. 1. In other examples, the object may be any other object in an environment, including but not limited to, a pedestrian, a cyclist, an animal, and/or the like. In the example 204, for clarity, the illustrated LiDAR data 206 is a subset of LiDAR data taken from one or more scans. That is, additional LiDAR points that are not associated with the object are removed for clarity in the example 204.

The example 204 also illustrates a bounding box 208 disposed around the lidar data 206. For example, the bounding box 208 is a cuboid defined by eight vertices 210. The bounding box 208 is a three-dimensional bounding box arranged in a three-dimensional coordinate system, e.g., a cartesian coordinate system. A representation including the example 204 shows x-, y-, and z-directions, and the bounding box 208 has an extent, e.g., a maximum extent of the object, in each of the respective directions. More specifically, each of the vertices 210 has an x—, a y—, and a z-coordinate in the coordinate system. Although the example 214 shows a three-dimensional, cartesian coordinate system, other three-dimensional coordinate systems, two-dimensional coordinate systems, and/or the like may be used to define the representation of the object determined from the LiDAR data 206. The LiDAR data representative of the object can be determined, from among all LiDAR points, using a number of different grouping or association techniques. Without limitation, the LiDAR data 206 may be determined based at least in part on intensity information associated with the LiDAR data 206, range information associated with the LiDAR data, and/or other data.

At an operation 212, the process 200 includes identifying, based on the coordinates of the object representation, points of radar data associated with the object. An example 214 accompanying the operation 212 illustrates radar data as a number of radar points or radar returns. The radar data includes associated returns 216, e.g., returns that are associated with the object (or object representation), and unassociated returns 218, e.g., returns that are not associated with the object (or object representation). The example 214 also includes a coordinate system including a range, an azimuth, and an elevation. Each of the radar returns 216, 218 may have associated range information, e.g., a depth from the sensor, azimuth information, e.g., an angular position in a first (e.g., horizontal) plane, and/or elevation information, e.g., an angular position above (or below) the first plane. The positions of the radar returns may be transformed or otherwise compared to the cartesian coordinate system of the example 204, e.g., to determine whether the radar returns are at locations corresponding to positions in the bounding box 208 or positions outside the bounding box 208. Accordingly, at the operation 202 sensor data is used to determine the presence of (and an indication of) an object, and at the operation 212 radar returns are identified that are associated with the object/object indication.

At an operation 220, the process 200 includes aggregating the velocity data for the object. For instance, the operation 220 can include determining a velocity profile for the object from the radar data. An example 222 accompanying the operation 220 includes a representation 224 including a velocity profile 226. The velocity profile 226 may be the same as or similar to the velocity profiles 138, 140 discussed above. As shown, the velocity profile 226 is a plot of velocity values, e.g., Doppler velocity values, relative to depths of the associated returns 216. In some instances, the velocity profile 226 may be a projection of the associated returns 216 into the velocity/range plane.

The example 222 also illustrates an annotation 228 associated with the profile 226. The annotation 228 may be the same as or similar to the annotations 142, 144 discussed above. For example, the annotation 228 may be a two-dimensional bounding box bounded by the minimum and maximum velocities of the associated returns 216 and by the minimum and maximum range values (e.g., depths) of the associated returns 216.

At an operation 230, the process 200 includes associating the velocity profile with the object. An example 232 accompanying the operation 230 illustrates labelled data 234, comprising the velocity profile 226 associated with the bounding box 208. The profile 226, the annotation 228, and/or information associated with the profile 226 and/or the annotation 228 may be associated with the bounding box 208 as a tag, label, metadata, and/or the like. Additional data may also be associated with the bounding box 208. As detailed above in connection with FIG. 1, the labelled data 234 may be passed through one or more machine-learning models, like the machine learning model(s) 132.

From the foregoing description of FIG. 2, the process 200 can be used to label object data with velocity information, generated from radar data. In contrast, conventional techniques often ignored per-point or per-return velocity data when labelling and considering objects. However, comparing depth/azimuth/elevation measurements to coordinates of a bounding box to determine an association of radar points with an object allows for fast and accurate results. Moreover, the association of the velocity data with the object can allow for improved perception of the environment, at least in part because the velocity data generated by radar sensors is often very precise.

Figure 3:
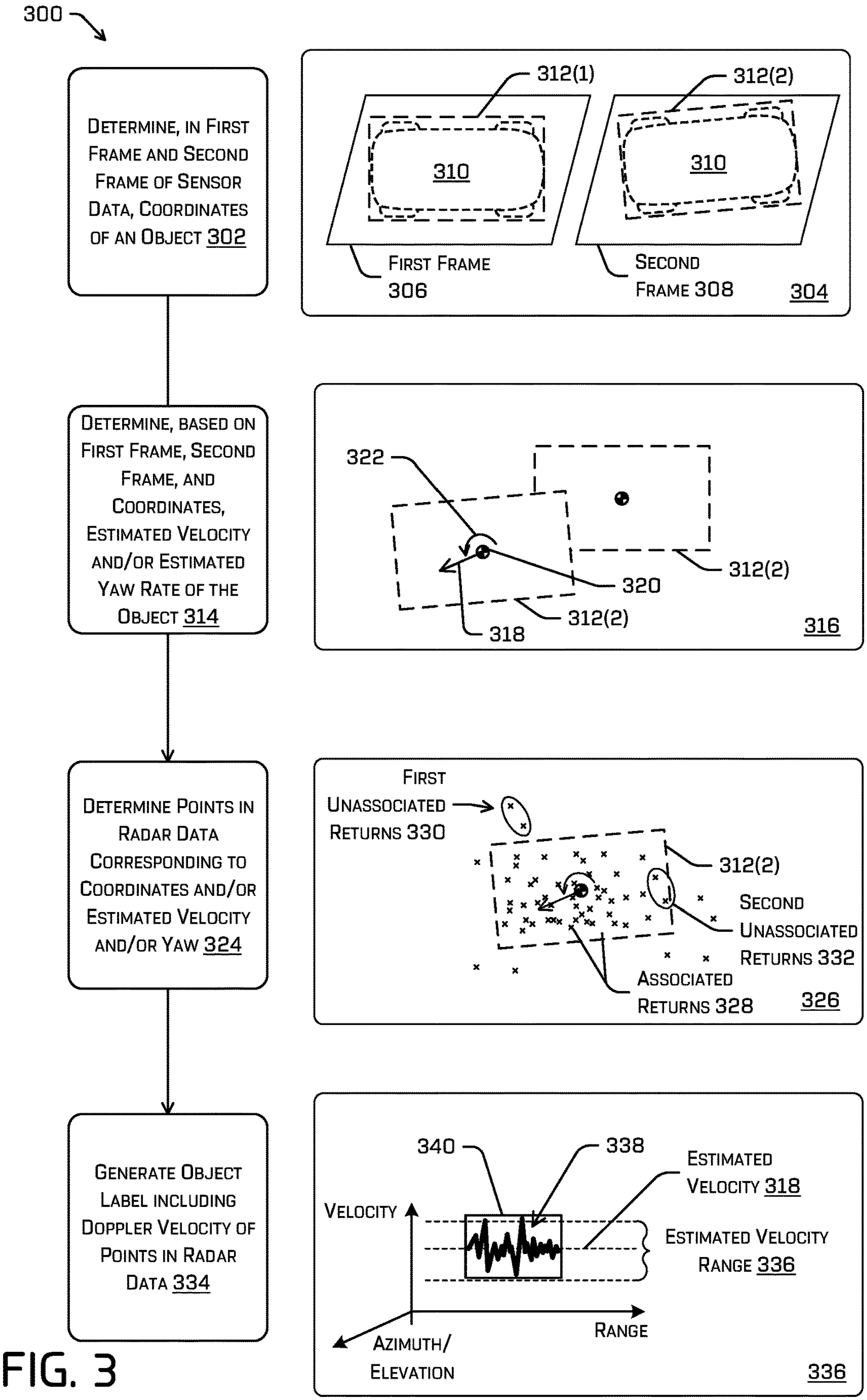
FIG. 3 includes textual and visual flowcharts to illustrate another example method for associating radar data with an object, according to aspects of this disclosure.

FIG. 3 includes textual and visual flowcharts to illustrate an example process 300 for associating radar data with an object detected using sensor data. In examples described herein, the radar data may be obtained by radar sensors disposed on an autonomous vehicle.

At an operation 302, the process 300 includes determining, in a first frame of sensor data and a second frame of sensor data, coordinates of an object. An example 304 accompanying the operation 302 schematically illustrates a first frame 306 of data and a second frame 308 of data. In implementations, the first frame 306 and the second frame 308 may be generated by a same sensor, which may be one of the additional sensors 116 discussed above. The first frame 306 includes sensor data representing an environment at a first time, and the second frame 308 includes sensor data representing an environment at a second time, different from the first time. For example, the first frame 306 and the second frame 308 may be consecutive or sequential frames, although such is not required. For ease of illustration, the first frame 306 and the second frame 308 are illustrated as top-down, e.g., two-dimensional, representations of data. As will be appreciated, the frames 306, 308 may include three-dimensional data or data in other dimensions. For instance, the frames 306, 308 may be generated, at least in part, by a LiDAR sensor, in which case the frames 306, 308 can include LiDAR point could data. In still further examples, the frames 306, 308 may include camera data (which may be two- or three-dimensional), time-of-flight data, radar data, and/or other types of sensor data.

In the example 304, the first frame 306 and the second frame 308 include data associated with an object 310 (e.g., a vehicle). When the first frame 306 and the second frame 308 are in the same coordinate system, it may be clear that the object 310 has moved, e.g., in the coordinate system and/or relative to a sensor capturing the frames 306, 308. The example 304 also shows a first bounding box 312(1) as a representation of the object 310 in the first frame 306 and a second bounding box 312(2) as a representation of the object 310 in the second frame 306. Again, although the bounding boxes 312 are shown as two-dimensional, rectangular bounding boxes, the bounding boxes 312 may alternatively be three-dimensional or the like. The two-dimensional representation is for ease of illustration. As will be appreciated, the bounding boxes 312 are defined by coordinates, e.g., coordinates of vertices in a coordinate system, such as a cartesian coordinate system. Moreover, although examples described herein use bounding boxes to represent one or more points, in further examples, the object 310 may be otherwise represented, including without limitation, by a contour, a point, a cluster of points, At an operation 314, the process 300 includes determining, based on the frames and the coordinates, an estimated velocity and/or an estimated yaw rate of the object. An example 316 accompanying the operation 314 shows the first bounding box 312(1) and the second bounding box 312(2) partially superimposed over each other. For example, the bounding boxes 312 may be arranged in the same coordinate system, to demonstrate a change in location and/or orientation of the object 310 between the first frame 306 and the second frame 308. As will be appreciated, between the first frame 306 and the second frame 308, the object has moved (from right to left in the illustration) and has rotated (counter-clockwise in the illustration). Because the coordinates of the bounding boxes 312 and times associated with the first frame 306 and the second frame 308 are known, an estimated velocity 318 can be generated for the object 310. For instance, the estimated velocity 318 may represent a positional difference, over time, of the first bounding box 312(1) relative to the second bounding box 312(2). In some examples, the velocity can be determined by interpolating between the frames 306, 308. In the example 316, the velocity is shown as a velocity of a center 320 of the object, although the velocity may be a velocity at any point on the object 310.

An estimated yaw rate 322 of the object 310 also can be determined at the operation 314. In examples, the estimated yaw rate 322 may be based at least in part on a model of the object, e.g., a vehicle model in the example of FIG. 3. The estimated yaw rate 322 also is illustrated as a yaw rate about the center 320 of the object 310, although such is not required. As discussed further below, the estimated yaw rate 322 may be used to determine a range of estimated velocities for the object 310. For example, based on the estimated yaw rate 322, the techniques described herein can determine velocities of the object at positions spaced from the center 320 of the object 310, e.g., at extents of the bounding boxes 312. As will be appreciated, with the object 310 rotating, the perceived velocity of the object 310, e.g., the perceived velocity relative to the senor, will be different at different positions on the object 310.

At an operation 326, the process 300 includes determining points in the radar data corresponding to the coordinates an/or to the estimated velocity and/or estimate yaw. In some examples, the operation 326 can be similar to the operation 212, e.g., in which radar returns are checked to determine whether they are within the physical confines of the bounding box. In the process 200, when the returns are determined to be in the bounding box 208, the returns are determined to be the associated returns 216, that is, associated with the object. Similarly, in an example 326 accompanying the operation 324, a plurality of radar returns are shown with the second bounding box 312(2). In this example, the radar returns include associated returns 328, e.g., that are spatially in the second bounding box 312(2) and first unassociated returns 330, that are outside the confines of the bounding box 312(2).

In the example 326, the radar returns also include second unassociated returns 332 that are inside the bounding box. In this example, the second unassociated returns 332 may be excluded from the associated returns 328 based at least in part on the velocity measurement associated with the second unassociated returns 332. More specifically, the operation 324 can include comparing velocity information associated with the radar returns to the estimated velocity 318. For example, the second unassociated returns 332 may have an associated velocity that differs from the estimated velocity by more than a threshold velocity. Without limitation, the threshold velocity may be based on the estimated velocity, e.g., the threshold may be a percentage (5%, 10%, 20%, or the like) of the estimated velocity. In other examples, the threshold may be based at least in part on the type of the object. For instance, the threshold may be smaller for pedestrians than for vehicles. Other thresholding techniques also may be used.

The operation 324 can also include comparing velocity information associated with the radar returns with an estimated velocity range or velocity spread, determined based at least in part on the estimated yaw rate 322. As noted above, the yaw rate 322, along with a model of the object 310, extents of the bounding box, the estimated velocity 318, and/or other information, may be used to determine an estimated range of velocities that are likely to be associated with the object. For instance, when the estimated yaw rate 322 of the object is known, along with the extents of the object, a relative velocity of the object can be determined for any point on the object. The range of these relatively velocities may be the estimated velocity range. Using this range, the operation 324 can reject radar returns that may appear to be spatially aligned with the object, but that have a different, e.g., unexpected, velocity component. Practically, the second unassociated returns 332 may correspond to radar returns that are proximate the object 310, but that may be generated by radio waves reflecting off some other, closely situated surface.

At an operation 334, the process 300 includes generating an object label including the Doppler velocity of points in the radar data. In some examples, the operation 334 may generally correspond to the operations 220 and/or the operations 230, discussed above. Specifically, as shown in an example 336 accompanying the operation 334, the process 300 includes generating a velocity profile 338 based on the associated returns 328. An annotation 340 may be associated with the velocity profile 338, e.g., as a bounding box in the velocity/range dimension. In the example 336, the representation of the velocity profile 338 also includes a representation of the estimated velocity 318. As will be appreciated, the measured velocities represented in the velocity profile may be generally close to the estimated velocity 318. The representation of the velocity profile 338 also includes a representation of an estimated velocity range 342. The estimated velocity range 336 is a visualization of the estimated velocity spread that may be determined based on the estimated yaw 322.

As just described, the process 300 estimates attributes of a detected object, and uses those estimations to determine radar points that should be associated with, or disassociated from, a representation of the object. The techniques of the process 300 may be more robust than the techniques of the process 200, e.g., because they use velocity, in addition to physical coordinates, to associate points.

Figure 4:
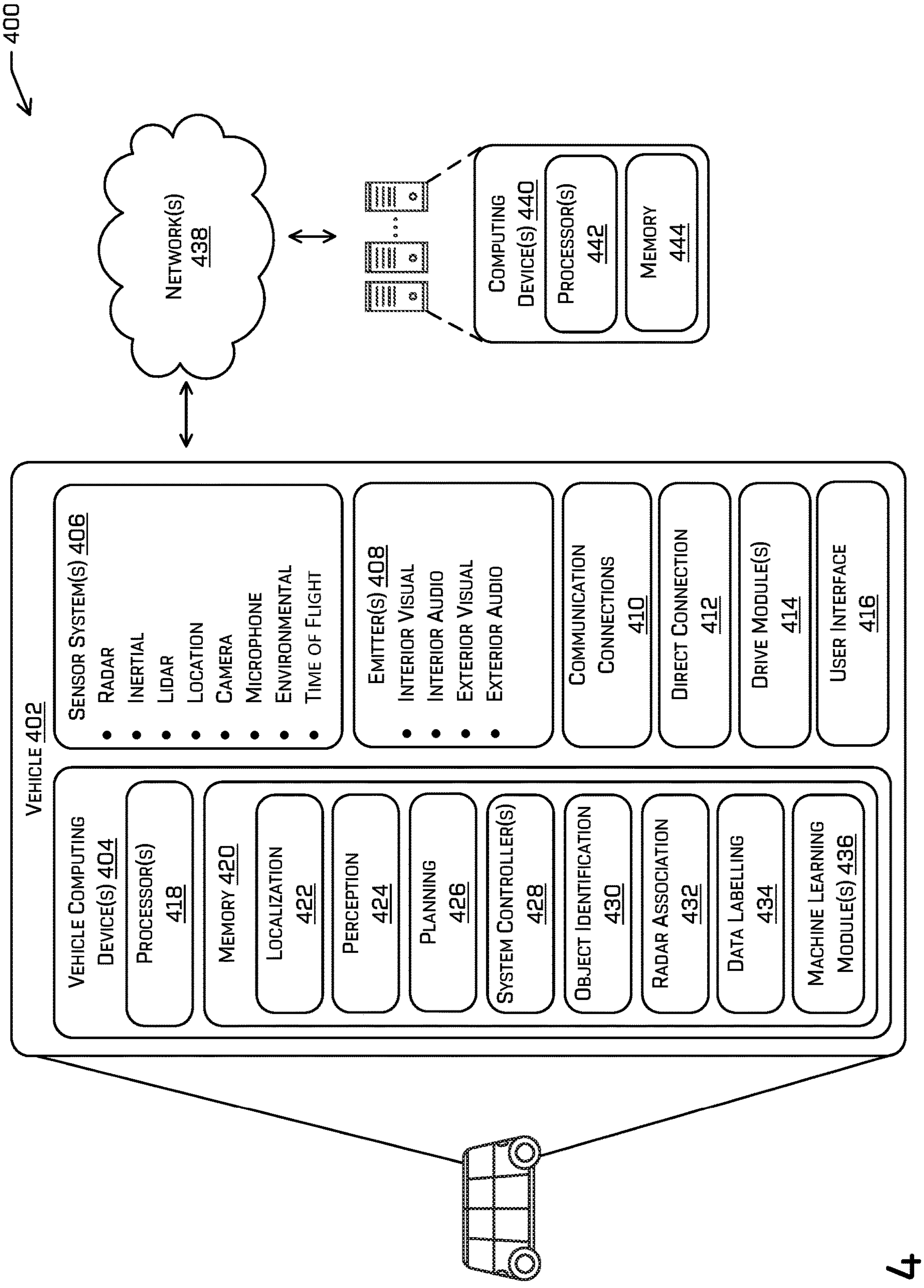
FIG. 4 is a block diagram of an example system for associating radar data with an object, according to aspects of this disclosure.

FIG. 4 is a block diagram of an example system 400 for implementing the techniques described herein. In at least one example, the system 400 can include a vehicle 402, which can be the same vehicle as the vehicle 102 described above with reference to FIG. 1.

The vehicle 402 can include one or more vehicle computing devices 404, one or more sensor systems 406, one or more emitters 408, one or more communication connections 410, at least one direct connection 412, one or more drive modules 414, and a user interface 416.

The vehicle computing device(s) 404 can include one or more processors 418 and memory 420 communicatively coupled with the one or more processors 418. In the illustrated example, the vehicle 402 is an autonomous vehicle; however, the vehicle 402 could be any other type of vehicle. In the illustrated example, the memory 420 of the vehicle computing device 404 stores a localization component 422, a perception component 424, a planning component 426, one or more system controllers 428, an object identification component 430, a radar association component 432, a data labelling component 434, and one or more machine learned model(s) 436. Though depicted in FIG. 4 as residing in the memory 420 for illustrative purposes, it is contemplated that the localization component 422, the perception component 424, the planning component 426, the one or more system controllers 428, the object identification component 430, the radar association component 432, the data labelling component 434, and one or more the machine learned model(s) 436 can additionally, or alternatively, be accessible to the vehicle 402 (e.g., stored on, or otherwise accessible by, memory remote from the vehicle 402).

In at least one example, the localization component 422 can include functionality to receive data from the sensor system(s) 406 to determine a position and/or orientation of the vehicle 402 (e.g., one or more of an x-, y-, z-position, roll, pitch, or yaw). For example, the localization component 422 can include and/or request/receive a map of an environment and can continuously determine a location and/or orientation of the autonomous vehicle within the map. In some instances, the localization component 422 can utilize SLAM (simultaneous localization and mapping), calibration, localization, and mapping, simultaneously techniques, relative SLAM, bundle adjustment, non-linear least squares optimization, or the like to receive image data, LiDAR data, radar data, IMU data, GPS data, wheel encoder data, and the like to accurately determine a location of the autonomous vehicle. In some instances, the localization component 422 can provide data to various components of the vehicle 402 to determine an initial position of an autonomous vehicle for generating a candidate trajectory, as discussed herein.

In some instances, the perception component 424 can include functionality to perform object detection, segmentation, and/or classification. In some examples, the perception component 424 can provide processed sensor data that indicates a presence of an entity that is proximate to the vehicle 402 and/or a classification of the entity as an entity type (e.g., car, pedestrian, cyclist, animal, building, tree, road surface, curb, sidewalk, unknown, etc.). In additional and/or alternative examples, the perception component 424 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. By way of non-limiting example, the perception component 424 may generate the object representations 136, as discussed herein.

The planning component 426 can determine a path for the vehicle 402 to follow to traverse through an environment. The planning component 426 can determine various routes and trajectories and various levels of detail. For example, the planning component 426 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 426 can generate an instruction for guiding the autonomous vehicle along at least a portion of the route from the first location to the second location. In at least one example, the planning component 426 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 402 to navigate.

In at least one example, the vehicle computing device 404 can include one or more system controllers 428, which can be configured to control steering, propulsion, braking, safety, emitters, communication, and other systems of the vehicle 402. These system controller(s) 428 can communicate with and/or control corresponding systems of the drive module(s) 414 and/or other components of the vehicle 402.

The object identification component 430 may be the object identification component 126 detailed above. Generally, the object identification component 430 can include functionality to receive sensor data and generate representations of objects from the sensor data, e.g., as object representations, such as bounding boxes, or the like.

The radar association component 432 can be the radar association component 128. The radar association component 432 generally includes functionality to determine radar points that are associated with the object(s) identified by the object identification component 430. For example, the radar association component can identify radar points based on location information and/or based on attributes of the detected object, such as an estimated velocity and/or an estimated yaw of the object.

The data labelling component 434 can be the data labelling component 130. The data labelling component 434 generally includes functionality to aggregate data from the radar returns identified by the radar association component 432, and label the object with the aggregated data. In examples, the aggregated data can be a velocity profile of the object, an annotation, such as a bounding box associated with the velocity profile, or the like.

The machine-learned model(s) 436 can be the machine-learned model(s) 132. The machine-learned model(s) 436 generally include functionality to receive the labelled (with velocity information) data and determine aspects of the detected object. For example, the machine-learned model(s) 436 can be trained to identify an intention of an object, (e.g., turning, travelling in a straight line, or the like), to differentiate between objects (e.g., to perceive an occluded object or two or more objects that are in close proximity), and/or to perceive objects more quickly and/or at greater distances.

Although shown separate from other components for clarity and ease of reference, functionality of the object identification component 430, the radar association component 432, the data labelling component 434, and/or the machine-learned model(s) 436 may be performed by other aspects of the vehicle 402. Without limitation, one or more of those components may be incorporated into the perception system 424. Aspects of this disclosure provide improved functionality resulting at least in part from associating high-resolution velocity data with representations of objects, according to the techniques detailed herein.

In at least one example, the sensor system(s) 406 can include the radar sensors described herein and/or the additional sensors described herein. Also in examples, the sensor system(s) 406 can include LiDAR sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 can include multiple instances of each of these or other types of sensors. For instance, and as discussed herein, implementations of this disclosure may use multiple scans from multiple sensors, e.g., multiple radar sensors, with overlapping fields of view. Thus, for example, the autonomous vehicle 402 may include a number of radar sensors. In additional examples, the LiDAR sensors can include individual LiDAR sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the vehicle computing device 404. Additionally, or alternatively, the sensor system(s) 406 can send sensor data, via the one or more networks 438, to the one or more computing device(s) at a particular frequency, after a lapse of a predetermined period of time, in near real-time, etc.

The emitter(s) 408 may be configured to emit light and/or sound. The emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. In some examples, one or more of the interior emitters may be used to signal to the passenger that the vehicle is approaching or has arrived at an unmapped region and that continued movement in the unmapped region will require permission and/or manual control. In addition, or alternatively, the interior emitters may alert the passenger(s) that a teleoperator or other external source (e.g., a passenger-in-waiting) has taken manual control of the vehicle 402. The emitter(s) 408 in this example can also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The communication connection(s) 410 can enable communication between the vehicle 402 and one or more other local or remote computing device(s). For instance, the communication connection(s) 410 can facilitate communication with other local computing device(s) on the vehicle 402 and/or the drive module(s) 414. Also, the communication connection(s) 410 can allow the vehicle to communicate with other nearby computing device(s) (e.g., other nearby vehicles, traffic signals, etc.). The communications connection(s) 410 also enable the vehicle 402 to communicate with a remote teleoperations computing device or other remote controllers.

The communications connection(s) 410 can include physical and/or logical interfaces for connecting the vehicle computing device 404 to another computing device or a network, such as network(s) 438. For example, the communications connection(s) 410 can enable Wi-Fi-based communication such as via frequencies defined by the IEEE 802.11 standards, short range wireless frequencies such as Bluetooth®, cellular communication (e.g., 2G, 4G, 4G, 4G LTE, 5G, etc.) or any suitable wired or wireless communications protocol that enables the respective computing device to interface with the other computing device(s).

In at least one example, the vehicle 402 can include the drive module(s) 414. In some examples, the vehicle 402 can have a single drive module 414. In at least one example, if the vehicle 402 has multiple drive modules 414, individual drive modules 414 can be positioned on opposite ends of the vehicle 402 (e.g., the front and the rear, etc.). In at least one example, the drive module(s) 414 can include one or more sensor systems to detect conditions of the drive module(s) 414 and/or the surroundings of the vehicle 402. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LiDAR sensors, radar sensors, etc. Some sensors, such as the wheel encoders can be unique to the drive module(s) 414. In some cases, the sensor system(s) 406 on the drive module(s) 414 can overlap or supplement corresponding systems of the vehicle 402 (e.g., the sensor system(s) 406).

The drive module(s) 414 can include many vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 414 can include a drive module controller which can receive and preprocess data from the sensor system(s) 406 and to control operation of the various vehicle systems. In some examples, the drive module controller can include one or more processors and memory communicatively coupled with the one or more processors. The memory can store one or more modules to perform various functionalities of the drive module(s) 414. Furthermore, the drive module(s) 414 also include one or more communication connection(s) that enable communication by the respective drive module with one or more other local or remote computing device(s).

In at least one example, the direct connection 412 can provide a physical interface to couple the one or more drive module(s) 414 with the body of the vehicle 402. For example, the direction connection 412 can allow the transfer of energy, fluids, air, data, etc. between the drive module(s) 414 and the vehicle. In some instances, the direct connection 412 can further releasably secure the drive module(s) 414 to the body of the vehicle 402.

The user interface 416 may include one or more devices, buttons and/or control panels via which a passenger can communicate with the vehicle 402. In non-limiting examples, a passenger in the vehicle 402 may control functionality of the vehicle 402 via interaction(s) with the user interface 416. In other examples, the user interface 416 may comprise a microphone configured to receive a verbal or spoken input. Generally, the user interface 416 may provide a means though which a passenger can interface with the vehicle computing device(s) 404.

In at least one example, the vehicle 402 may be in communication, via one or more network(s) 438, with one or more computing device(s) 4440. For example, as described herein, the vehicle 402 can communicate with the one or more computing device(s) 4440 via the network(s) 438. In some examples, the vehicle 402 can receive control signals from the computing device(s) 440. In other examples, the vehicle 402 can transmit information to the computing device(s) 440.

The computing device(s) 440 may be embodied as a fleet management system. In at least one example, the computing device(s) 440 can include processor(s) 442 and memory 444 communicatively coupled with the processor(s) 442. In the illustrated example, the memory 444 of the computing device(s) 440 can store computing components that may correspond to any or all of the computing components described herein.

In some instances, aspects of some or all of the components discussed herein, including but not limited to the machine-learned model (s) 436, can include any models, algorithms, and/or machine learning algorithms. For example, in some instances, aspects of the components in the memory 420, 444 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can use machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNetl01, VGG, DenseNet, PointNet, and the like.

FIG. 5 (as well as FIGS. 2 and 3 discussed above) illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 depicts an example process 500 for controlling a vehicle using radar-based object detection techniques detailed herein. For example, some or all of the process 500 can be performed by one or more components in FIG. 4, as described herein. Without limitation, some or all of the process 500 can be performed by the object identification component 430, the radar association component 432, the data labelling component 434, and/or the machine learned model (s) 436.

At an operation 502, the process 500 includes receiving sensor data. As described above, the vehicle 102 can include a plurality of sensors, including the radar sensors 110 and the additional sensors 116. The operation 502 may include receiving the sensor data 122 from the additional sensors 116. In examples, the sensor data 122 may be a lidar point cloud, image data, time-of-flight returns, and or other data types.

At an operation 504, the process 500 includes identifying object attributes from the sensor data. For example, and as detailed herein, the object identification component 430 may include functionality to identify objects in sensor data and generate a representation of those objects. Without limitation, the operation 504 can include generating one or more bounding boxes, which may be two- or three-dimensional bounding boxes. The representations may have extents in a coordinate frame, such as a Cartesian coordinate frame. In some examples, the operation 504 can include comparing multiple instances of the same object, e.g. over multiple frames of data. As discussed above in connection with the process 300, using multiple frames of data may allow for estimating a velocity of the detected object, estimating a yaw rate of the detected object, or the like.

At an operation 506, the process 500 includes identifying radar points based at least in part on the object attributes. In examples, the operation 506 may correspond to the operation 212 and/or the operation 324 detailed above.

At an operation 508, the process 500 includes generating labeled data that associates Doppler velocities of the points with the object. As detailed herein, aspects of this disclosure relate to associating velocity data with object representations. At the operation 508, a velocity profile may be generated based on the velocity information associated with the points identified at the operation 506. The velocity profile may be associated with the object representation e.g. as a tag, a label, metadata, and/or other information. In some examples, and annotation of the velocity profile may also, or alternatively, be associated with the object representation. In examples described herein, the velocity profile may be a two-dimensional profile that associates velocities, e.g., Doppler velocities, with depth information.

At an operation 510 the process 500 includes passing the labeled data to a machine-learned model. For example, the machine-learned model may be trained on object representations that include velocity information, such as micro-Doppler signatures, or the like. As detailed herein, the high resolution velocity information may enable machine-learned models that provide many benefits over conventional models.

At an operation 512, the process 500 includes receiving, from the machine-learned model, perception data informed at least in part on the Doppler velocity information. As detailed herein, the velocity information may be used by machine-learned model to determine intentions of a vehicle or other object, such as whether the object is turning, continuing in a straight path, or the like. Moreover, the machine-learned models may be trained to identify occluded objects, including objects that may be critical objects that could impact travel of the vehicle. Other machine-learned models may be trained to provide outputs that distinguish between closely positioned, or overlapping objects, to identify objects traveling at an excessive rate, and/or two identify objects at relatively far distances from the sensor.

At an operation 514, the process 500 can include controlling an autonomous vehicle based at least in part on the perception data. For example, using perception data generated according to the process 500 may allow it and autonomous vehicle to navigate through an environment relative to objects labeled using the radar data. Although discussed in the context of an autonomous vehicle, the process 500, and the techniques and systems described herein, can be applied to a variety of systems using sensors.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks, or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A: An example vehicle includes: a lidar sensor associated with the vehicle; a radar sensor associated with the vehicle; one or more processors; and memory storing non-transitory computer-readable instructions that, when executed, configure the one or more processors to perform operations comprising: receiving lidar data from the lidar sensor; determining, based at least in part on the lidar data, three-dimensional coordinates of an object in an environment; receiving radar data from the radar sensor, the radar data including Doppler velocity information and one or more of range information, azimuth information, or elevation information; determining, based at least in part on the three-dimensional coordinates and the at least one of the range information, the azimuth information, or the elevation information, radar points of the radar data associated with the object; and generating object data that associates individual Doppler velocities of the radar points with the object.

B: The vehicle of example A, wherein: the determining the three-dimensional coordinates of the object in the environment comprises determining instances of the three-dimensional coordinates of the object at a first frequency; the receiving the radar data comprises receiving instances of the radar data at a second frequency higher than the first frequency; and the generating the object data comprises associating the Doppler velocities of the radar points associated with multiple instances of the radar data generated at different times with a single instance of the object data based on multiple instances of the radar data associated with a single instance of the three-dimensional coordinates of the object.

C: The vehicle of example A or example B, the operations further comprising: generating a two-dimensional projection associated with the subset of the radar points, the two-dimensional projection comprising Doppler velocities of individual of the radar points relative to depths of the individual of the radar points, wherein the generating the object data comprises associating the two-dimensional projection with the object.

D: The vehicle of any one of example A through example C, wherein the generating the two-dimensional projection comprises, at least in part, associating an annotation representative of a velocity spread of the subset of the plurality of the radar points.

E: The vehicle of any one of example A through example D, wherein: the determining the estimated state of the object comprises: identifying the object in a first frame of the lidar data; identifying the object in a second frame of the lidar data; and determining, based at least in part on the first frame and the second frame, an estimated velocity of the object as the estimated state.

F: The vehicle of any one of example A through example E, further comprising: passing the object data to a machine-learned model, the machine-learned model being configured to output at least one of: an expected motion of the object, or additional information about the object; and controlling the vehicle based at least in part on the expected motion of the object or the additional information about the object.

G: An example method includes: determining, from first sensor data, an attribute of an object in an environment; receiving, from a radar sensor, radar data associated with the environment, the radar data comprising radar points having associated Doppler velocities; determining, based at least in part on the attribute of the object, a subset of the radar points associated with the object; and generating object data that associates Doppler velocities of the subset of the radar points with the object.

H: The method of example G, wherein: the attribute of the object is a physical extent of the object in a coordinate system; and the determining the subset of the radar points comprises comparing at least one of range information, azimuth information, or elevation information associated with the radar points to the physical extent of the object.

I: The method of example G or example H, wherein the determining the attribute of the object comprises: receiving a first frame of the first sensor data; determining a first representation of the object in the first frame; receiving a second frame of the first sensor data; determining a second representation of the object in the second frame; and determining the attribute based at least in part on a difference between the first representation and the second representation.

J: The method of any one of example G through example I, wherein the determining the attribute comprises determining an estimated velocity of the object based at least in part on the difference between the first representation and the second representation.

K: The method of any one of example G through example J, wherein the determining the subset of the radar points comprises, at least in part: comparing the Doppler velocities associated with the radar points to the estimated velocity; and determining the subset of the radar points as the radar points having an associated Doppler velocity that is within a threshold of the estimated velocity of the object.

L: The method of any one of example G through example K, wherein: the determining the attribute comprises determining an estimated yaw rate of the object based at least in part on the difference between the first representation and the second representation, and the determining the subset of the radar points comprises: determining, based at least in part on the estimated yaw rate and a model of the object, an estimated velocity range of the object; and determining the subset of the radar points as the radar points having an associated Doppler velocity that is within a threshold of the estimated velocity range.

M: The method of any one of example G through example L, further comprising: generating, based at least in part on the Doppler velocities of the subset of the radar points, a velocity profile for the object, wherein the velocity profile includes velocity values of the subset of the radar points as a function of a distance dimension.

N: The method of any one of example G through example M, wherein: the distance dimension is a depth dimension, and the velocity profile comprises a projection of individual of the subset of the radar points onto a two-dimensional space associated with the Doppler velocity and a distance in the depth dimension.

O: The method of any one of example G through example N, further comprising: associating an annotation with the velocity profile, wherein the annotation is representative of a velocity spread of the velocity profile.

P: The method of any one of example G through example O, further comprising: passing the object data to a machine-learned model, the machine-learned model being configured to receive the object data and output at least one of: an expected motion of the object, or additional information about the object.

Q: Example non-transitory computer-readable media storing instructions that, when executed by one or more processors, cause the one or more processors to perform operations comprising: determining, from first sensor data, an attribute of an object in an environment; receiving, from a radar sensor, radar data associated with the environment, the radar data comprising radar points having associated Doppler velocities; determining, based at least in part on the attribute of the object, a subset of the radar points associated with the object; and generating object data that associates Doppler velocities of the subset of the radar points with the object.

R: The non-transitory computer readable media of example Q, wherein: the attribute of the object is a physical extent of the object in a coordinate system; and the determining the subset of the radar points comprises comparing at least one of range information, azimuth information, or elevation information associated with the radar points to the physical extent of the object.

S: The non-transitory computer readable media of example Q or example R, wherein the determining the attribute of the object comprises: receiving a first frame of the first sensor data; determining a first representation of the object in the first frame; receiving a second frame of the first sensor data; determining a second representation of the object in the second frame; and determining the attribute based at least in part on a difference between the first representation and the second representation, wherein the determining the attribute comprises determining at least one of an estimated velocity of the object or an estimated yaw rate of the object.

T: The non-transitory computer readable media of any one of example Q through example S, the operations further comprising: generating, based at least in part on the Doppler velocities of the subset of the radar points, a velocity profile for the object, wherein the velocity profile includes the velocity values of the subset of the radar points as a function of a distance dimension.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A vehicle comprising:

a lidar sensor associated with the vehicle;

a radar sensor associated with the vehicle;

one or more processors; and memory storing non-transitory computer-readable instructions that, when executed, configure the one or more processors to perform operations comprising:

receiving lidar data from the lidar sensor;

determining, based at least in part on the lidar data and at the exclusion of radar data, an attribute of an object in an environment, wherein the determining the attribute of the object further comprises determining three-dimensional coordinates of the object in the environment by determining instances of the three-dimensional coordinates of the object at a first frequency;

receiving radar data from the radar sensor, the radar data including Doppler velocity information and one or more of range information, azimuth information, or elevation information, wherein instances of the radar data are received at a second frequency higher than the first frequency;

comparing the one or more of the range information, the azimuth information, or the elevation information to the attribute of the object;

determining, based at least in part on the comparing, a subset of radar points of the radar data associated with the object;

generating a two-dimensional projection associated with the subset of the radar points, the two-dimensional projection comprising Doppler velocities of individual points of the radar points relative to depths of the individual points of the radar points;

generating object data that associates the two-dimensional projection with the object, the generating the object data comprising associating the Doppler velocities of the radar points associated with multiple instances of the radar data generated at different times with a single instance of the object data based on multiple instances of the radar data associated with a single instance of the three-dimensional coordinates of the object;

sending the object data to a machine-learned model, the machine-learned model being configured to output an expected motion of the object;

receiving, as an output of the machine-learned model, the expected motion of the object; and controlling the vehicle based at least in part on the expected motion of the object.

2. The vehicle of claim 1, the operations further comprising:

generating a two-dimensional projection associated with the radar points, the two-dimensional projection comprising Doppler velocities of the radar points relative to depths of the radar points, wherein the generating the object data comprises associating the two-dimensional projection with the object.

3. The vehicle of claim 1 wherein the generating the two-dimensional projection comprises, at least in part, associating an annotation representative of a velocity spread of the radar points.

4. The vehicle of claim 1, the operations further comprising:

determining an estimated state of the object, wherein the determining the estimated state of the object comprises:

identifying the object in a first frame of the lidar data;

identifying the object in a second frame of the lidar data; and determining, based at least in part on the first frame and the second frame, an estimated velocity of the object as the estimated state.

5. The vehicle of claim 1, wherein the machine-learned model is further configured to output additional information about the object.

6. A method comprising:

determining, from first sensor data, at least one of an estimated velocity or an estimated yaw rate of an object in an environment;

determining, from the first sensor data, three-dimensional coordinates of the object in the environment by determining instances of the three-dimensional coordinates of the object at a first frequency;

receiving, from a radar sensor, radar data associated with the environment, the radar data comprising radar points having associated Doppler velocities, wherein instances of the radar data are received at a second frequency higher than the first frequency;

comparing the radar data to at least one of the estimated velocity or the estimated yaw rate;

determining, based at least in part on the comparing of the radar data to the at least one of the estimated velocity or the estimated yaw rate, a subset of the radar points associated with the object;

generating a two-dimensional projection associated with the subset of the radar points, the two-dimensional projection comprising Doppler velocities of individual points of the radar points relative to depths of the individual points of the radar points;

generating object data that associates the two-dimensional projection Doppler velocities of the subset of the radar points with the object, the generating the object data comprising associating the Doppler velocities of the radar points associated with multiple instances of the radar data generated at different times with a single instance of the object data based on multiple instances of the radar data associated with a single instance of the three-dimensional coordinates of the object;

determining, based at least in part on the object data, an expected motion of the object; and controlling a vehicle based at least in part on the expected motion of the object.

7. The method of claim 6, further comprising:

determining a physical extent of the object in a coordinate system, wherein the determining the subset of the radar points further comprises comparing at least one of range information, azimuth information, or elevation information associated with the radar points to the physical extent of the object.

8. The method of claim 6, wherein the determining the at least one of the estimated velocity or the estimated yaw rate of the object comprises:

receiving a first frame of the first sensor data;

determining a first representation of the object in the first frame;

receiving a second frame of the first sensor data;

determining a second representation of the object in the second frame; and determining the at least one of the estimated velocity or the estimated yaw rate based at least in part on a difference between the first representation and the second representation.

9. The method of claim 8, wherein the determining the at least one of the estimated velocity or the estimated yaw rate comprises determining the estimated velocity of the object based at least in part on the difference between the first representation and the second representation.

10. The method of claim 9, wherein the determining the subset of the radar points comprises, at least in part:

comparing the Doppler velocities associated with the radar points to the estimated velocity; and determining the subset of the radar points as the radar points having an associated Doppler velocity that is within a threshold of the estimated velocity of the object.

11. The method of claim 8, wherein:

the determining the at least one of the estimated velocity or the estimated yaw rate comprises determining an estimated yaw rate of the object based at least in part on the difference between the first representation and the second representation, and the determining the subset of the radar points comprises:

determining, based at least in part on the estimated yaw rate and a model of the object, an estimated velocity range of the object; and determining the subset of the radar points as the radar points having an associated Doppler velocity that is within a threshold of the estimated velocity range.

12. The method of claim 6, further comprising:

generating, based at least in part on the Doppler velocities of the subset of the radar points, a velocity profile for the object as the two-dimensional projection, wherein the velocity profile includes velocity values of the subset of the radar points as a function of a distance dimension.

13. The method of claim 12, wherein:

the distance dimension is a depth dimension, and the velocity profile comprises projections of individual points of the subset of the radar points onto a two-dimensional space associated with the Doppler velocity and a distance in the depth dimension.

14. The method of claim 12, further comprising:

associating an annotation with the velocity profile, wherein the annotation is representative of a velocity spread of the velocity profile.

15. The method of claim 12, further comprising:

sending the object data to a machine-learned model, the machine-learned model being configured to receive the object data and output at least one of:

an expected motion of the object, or additional information about the object.

16. Non-transitory computer-readable media storing instructions that, when executed by one or more processors, cause the one or more processors to perform operations comprising:

determining, from first sensor data, at least one of an estimated velocity or an estimated yaw rate of an object in an environment;

determining, from the first sensor data, three-dimensional coordinates of the object in the environment by determining instances of the three-dimensional coordinates of the object at a first frequency;

receiving, from a radar sensor, radar data associated with the environment, the radar data comprising radar points having associated Doppler velocities, wherein instances of the radar data are received at a second frequency higher than the first frequency;

comparing the radar data to at least one of the estimated velocity or the estimated yaw rate;

determining, based at least in part on the comparing of the radar data to the at least one of the estimated velocity or the estimated yaw rate, a subset of the radar points associated with the object;

generating a two-dimensional projection associated with the subset of the radar points, the two-dimensional projection comprising Doppler velocities of individual points of the radar points relative to depths of the individual points of the radar points;

generating object data that associates the two-dimensional projection Doppler velocities of the subset of the radar points with the object, the generating the object data comprising associating the Doppler velocities of the radar points associated with multiple instances of the radar data generated at different times with a single instance of the object data based on multiple instances of the radar data associated with a single instance of the three-dimensional coordinates of the object;

determining, based at least in part on the object data, an expected motion of the object; and controlling a vehicle based at least in part on the expected motion of the object.

17. The non-transitory computer readable media of claim 2, the operations further comprising:

determining a physical extent of the object in a coordinate system, wherein the determining the subset of the radar points further comprises comparing at least one of range information, azimuth information, or elevation information associated with the radar points to the physical extent of the object.

18. The non-transitory computer readable media of claim 16, wherein the determining the at least one of the estimated velocity or the estimated yaw rate of the object comprises:

receiving a first frame of the first sensor data;

determining a first representation of the object in the first frame;

receiving a second frame of the first sensor data;

determining a second representation of the object in the second frame; and determining the at least one of the estimated velocity or the estimated yaw rate based at least in part on a difference between the first representation and the second representation.

19. The non-transitory computer readable media of claim 16, the operations further comprising:

generating, based at least in part on the Doppler velocities of the subset of the radar points, a velocity profile for the object as the two-dimensional projection, wherein the velocity profile includes the velocity values of the subset of the radar points as a function of a distance dimension.

* * * * *